(12) United States Patent
Yarita et al.

(10) Patent No.: US 6,464,406 B1
(45) Date of Patent: Oct. 15, 2002

(54) UNIVERSAL ADAPTER

(75) Inventors: Mitsuo Yarita, Koto-ku; Masahiro Nakajima, Chiba; Hiroyuki Tokita, Koto-ku; Junji Taira, Chiba, all of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/526,147

(22) Filed: Mar. 15, 2000

(51) Int. Cl.[7] .................................................. G02B 6/38
(52) U.S. Cl. ............................. 385/60; 385/58; 385/56; 385/70
(58) Field of Search ................................ 385/60, 53, 55, 385/56, 58, 70, 71

(56) References Cited

U.S. PATENT DOCUMENTS

| | | | | |
|---|---|---|---|---|
| 5,274,729 A | * | 12/1993 | King et al. ................... | 385/134 |
| 5,717,801 A | * | 2/1998 | Smiley .......................... | 385/60 |
| 5,774,612 A | * | 6/1998 | Belenkiy et al. ............... | 385/72 |
| 6,283,640 B1 | * | 9/2001 | Stephenson et al. ........... | 385/58 |

FOREIGN PATENT DOCUMENTS

JP      404323607 A  * 11/1992  .................. 385/53

* cited by examiner

Primary Examiner—Rodney Bovernick
Assistant Examiner—Sung Pak
(74) Attorney, Agent, or Firm—Adams & Wilks (57) ABSTRACT

A universal optical connector adapter that can be used to connect optical connector plugs of the same or different types having ferrules fixed at ends of optical fibers. The universal adapter has first and second housings each having at one end a coupling portion for detachably coupling with an optical connector plug of a given type and on an opposite end a base plate having a reference plane. A cylindrical coupling member is rotatably held inward of the coupling portion of the first housing and incorporates a sleeve for fitting ferrules into opposite sides thereof. A male thread is provided on an outer periphery of the coupling cylindrical member and a female thread is provided in the coupling portion of the second housing on a side opposite to that in which an optical connector plug is coupled. The female thread is removably couplable with the male thread. The first and second housings can be coupled together so that the reference planes are closely contacted and the male thread and female thread are removable.

25 Claims, 7 Drawing Sheets

UNIVERSAL ADAPTER

BACKGROUND OF THE INVENTION

The present invention relates to a universal adapter for optically connecting between optical connector plugs provided at ends of optical fiber cables.

Conventionally, the optical connector has been used to optically connect between optical fiber cables. This type of connector is structured by an optical connector plug holding a ferrule fixed at an end of an optical fiber and an optical fiber adapter for optically connecting between the opposed plugs.

Meanwhile, there are a plurality of types of optical connectors like this, and they are separately used depending on the application. In order to connect between different plugs, there are prepared conversion adapters.

However, there is a problem in that, if there are a plurality of kinds of optical connectors, a plurality of kinds of conversion adapters are required to be prepared. That is, where using optical connectors of all FC type, an SC type and an ST type, for adapters and conversion adapters there is a necessity to prepare six kinds of adapters, resulting in a of very uneconomical procedure.

Also, in the manufacture of the apparatuses, there is a problem in that an adapter must be assembled after confirming the kind of optical connector being used.

Therefore, it is an object of the present invention to provide a universal adapter that can connect between the different types of optical connector plugs used.

SUMMARY OF THE INVENTION

A first respect of the invention for solving the above problem resides in providing a universal optical adapter for optical detachably connecting between optical connector plugs having ferrules fixing ends of optical fibers, the universal adapter comprising: first and second receptacle housings each having at one end a coupling portion as a cylinder in a form to decouplably couple with a desired optical connector plug and on the other end a reference plane; a coupling cylindrical member rotatably held inward of the coupling portion of the first receptacle housing and incorporating a sleeve for fitting ferrules from an opposite side; a male thread portion provided in an outer periphery of the coupling cylindrical member; a female thread portion provided in the coupling portion of the second receptacle housing on an opposite side to a coupling end with the optical connector plug and couplable with the male thread portion; wherein the first and second receptacle housings can be coupled in a state that the reference planes are closely contacted in a manner such that the male thread portion and the female thread portion are removable.

A second aspect of the invention resides in the universal adapter of the first aspect, wherein the coupling portions of the first and second receptacle housings are couplable with of optical connector plugs of an FC type, an SC type and an ST type.

A third aspect of the invention resides in the universal adapter of the first or second aspect, wherein a rotation groove engageable with a jig for rotating the coupling cylindrical member is formed in an end face on an opposite side to the coupling portion of the coupling cylindrical member.

A fourth form of the invention lies in the universal adapter wherein, in any of the first to third aspects, an engaging convex protrusion is provided on one of the reference planes of the first and second receptacle housings while a engaging concave portion for engagement with the engaging protrusion is provided on one of the reference planes of the first and second receptacle housings.

A fifth aspect of the invention lies in the universal adapter wherein, in the fourth aspect, the engaging convex portion and the engaging concave portion are provided in two sets to restrict movement in a direction along the reference plane and rotation in a plane along the reference plane.

A sixth aspect of the invention lies in the universal adapter wherein, in any of the first to fifth aspects, and wherein the second receptacle housing can be fixed to a member to be fixed in a state the reference plane is exposed, the first receptacle housing can be decouplably coupled to the fixed second receptacle housing.

DETAILED DESCRIPTION OF THE PREFERRED EMBODIMENTS

Next, an embodiment of an optical connector adapter according to the present invention will be explained based on the drawings. FIG. 1 to FIG. 7 exemplifies a universal adapter according to one embodiment of the invention.

Figure 1:
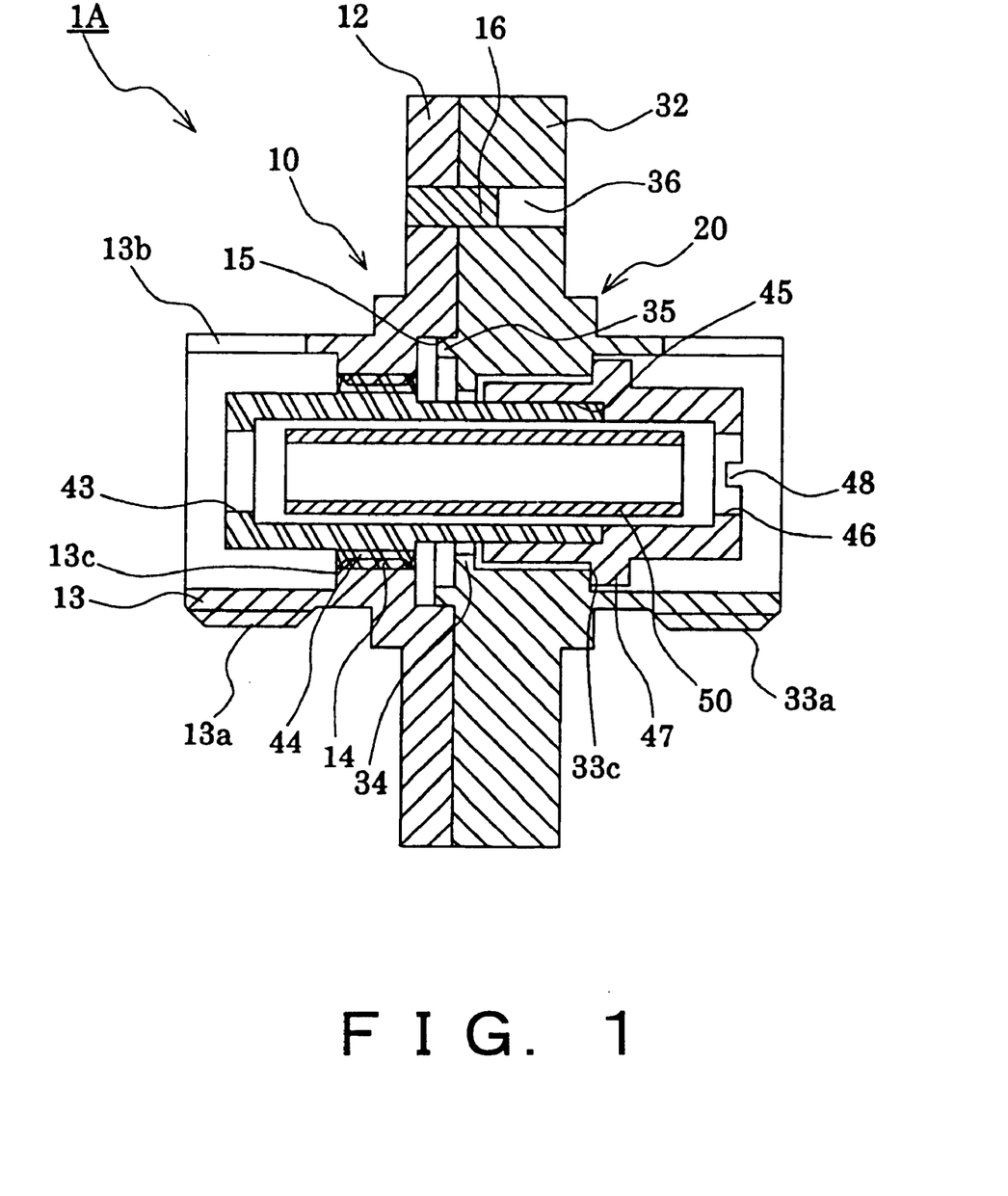
FIG. 1 is a sectional view of a universal adapter according to a first embodiment of the invention.
Figure 2:
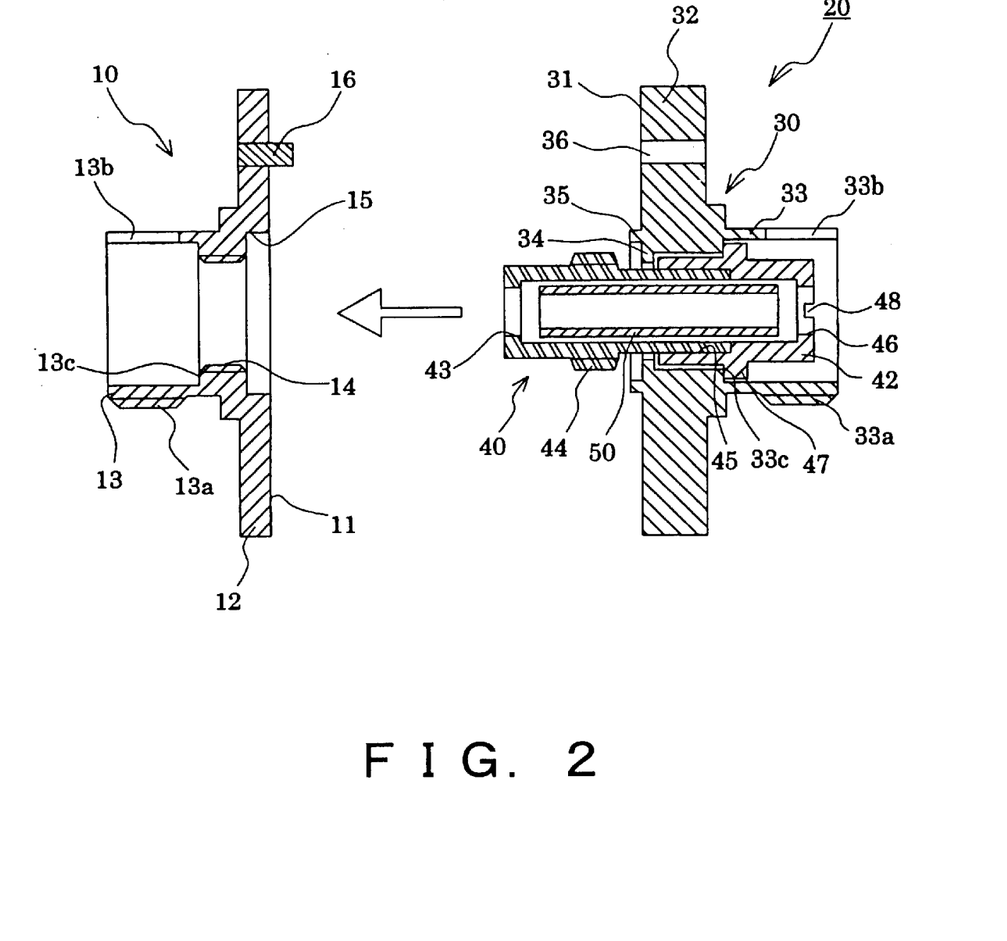
FIG. 2 is an assembly sectional view of a universal adapter according to the first embodiment of the invention.

The universal adapter 1A shown in FIG. 1 was assembled as an adapter for an FC-FC connection, and is assembled by an FC type receptacle housing 10 and an FC type receptacle 20 as shown in FIG. 2.

Figure 3:
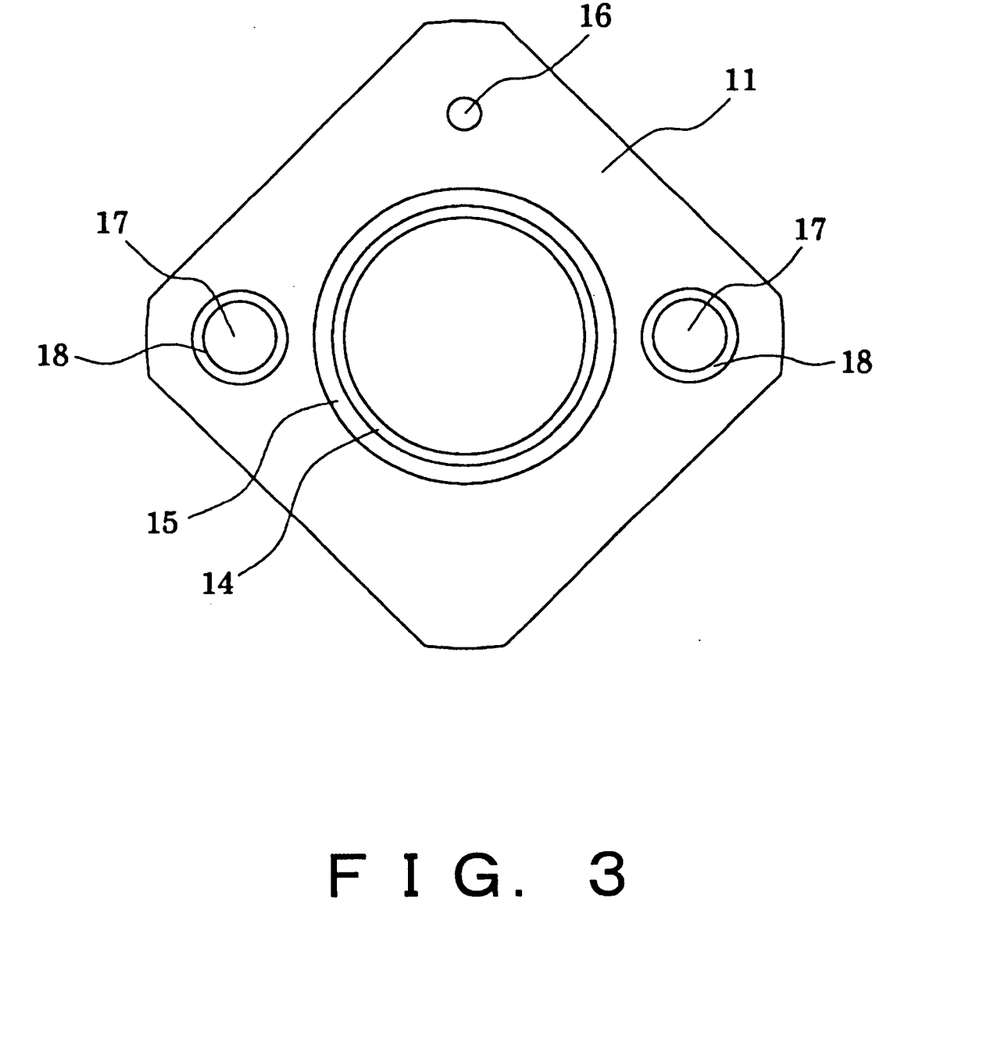
FIG. 3 is a rear view of a FC type receptacle housing in the first embodiment of the invention.
Figure 4:
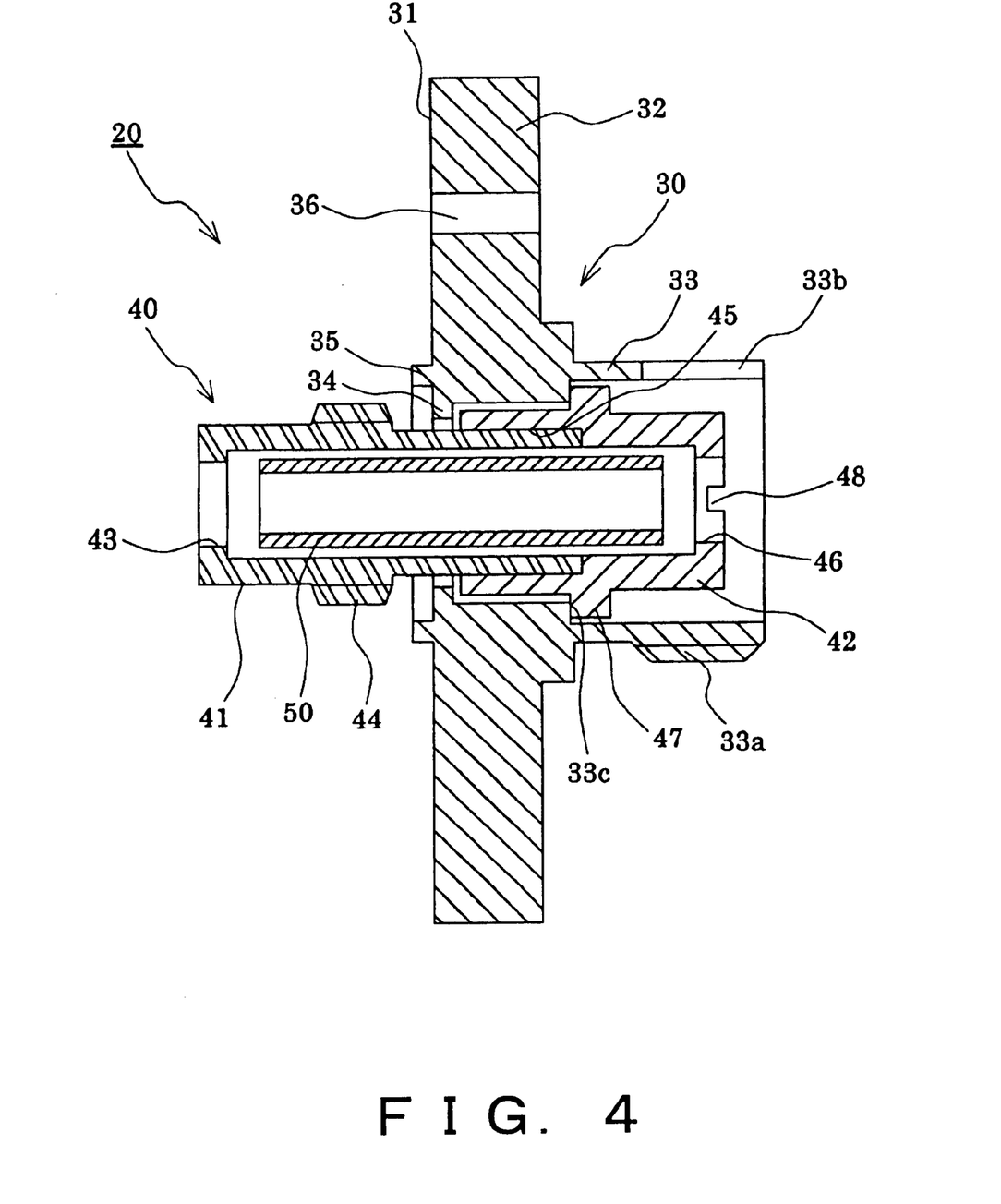
FIG. 4 is a sectional view of a FC type receptacle in the one embodiment of the invention.

The FC type receptacle housing 10 has, as shown in FIG. 3, a coupling portion 13 formed by a cylinder in a form to be coupled with an FC type optical connector plug, on an opposite side of a reference plane 11 of a base plate 12 having one end surface serving as the reference plane 11. The coupling portion 13 has a male thread portion 13a on an outer peripheral surface and a cut-out 13b for engagement with a key ring of the optical connector plug. Furthermore, a step portion 13c is provided in an inner peripheral surface.

A female thread portion 14 is provided in the inner surface of the coupling portion 13 on the reference plane 11 side. Also, on the reference surface side 11 of the base plate 12, a reference concave portion 15 is provided that is as a circular concave portion greater in diameter than the female thread portion 14. Furthermore, on the reference plane 11 side of the base plate 12, a reference pin 16 is provided protruding from the base plate 12 in the opposite direction from the coupling portion 13, and a pair of fixing throughholes 17 are provided. Incidentally, a taper formed concave portion 18 is provided at a peripheral edge portion on the reference plane 11 side of the fixing through-holes 17 such that a fixing screw can be accommodated therein.

Meanwhile, the FC type receptacle 20 is formed by an FC type receptacle housing 30 and a coupling cylindrical member 40.

The FC type receptacle housing 30 has generally the same shape as the FC type receptacle housing 10. That is, on an opposite side to a reference plane 31 of a base plate 32 having the reference plane 31 on one side, a coupling portion 33 is provided that is shaped like a cylinder with a form capable of coupling with the FC type optical connector plug. The coupling portion 33 is the same as the FC type receptacle housing 10 in that it has a male thread portion 33a, a cut-out 33b and a step portion 33c. Meanwhile, there is difference in that on the reference plane 31 side of the coupling portion 33, a small diameter portion 34 is provided, and in the reference plane 31 a ring formed reference convex portion 35 is provided to engage the reference concave portion 15 provided in the reference plane 11 of the FC type receptacle housing 10 and the base plate 32 is provided with a reference hole 36 to fit with the reference pin 16.

Meanwhile, the coupling cylindrical member 40 has a press-fitted pair comprising a first cylindrical member 41 and a second cylindrical member 42 and incorporates inside an optical connecting sleeve 50 such as a split sleeve. That is, the first cylindrical member 41 has an inner diameter size capable of incorporating the optical connecting sleeve 50 in a free-fitting state. On one end side, an optical coupling opening portion 43 is provided that has an inner diameter size greater than the inner diameter size of the optical connecting sleeve 50 although somewhat smaller in diameter than the outer diameter size thereof. Also, on an outer peripheral surface, a male thread portion 44 is provided to be coupled to the female thread portion 14 of the FC type receptacle housing 10. Also, the second cylindrical member 42 has a fitting portion 45 having an inner diameter size to be fitted with the first cylindrical member 41, and has on one end side an optical coupling opening portion 46 with generally the same size as the optical coupling opening portion 43 and on the outer peripheral surface a flange portion 47 having a greater diameter than the inner diameter of the step portion 33c. Furthermore, a pair of engaging grooves 48 are provided in diametrically opposite positions in a peripheral edge portion of the optical coupling opening portion 46. Incidentally, the first cylindrical member 41 and the second cylindrical member 42 have end shapes on sides of the optical coupling opening portions 43 and 46 which can couple with the optical connector plug.

If the first cylindrical member 41 and the second cylindrical member 42 thus formed are press-fitted in a state incorporating the optical connecting sleeve 50 and the first cylindrical member 41 is inserted in the small diameter portion 34 of the FC type receptacle housing 30, because the male thread portion 44 is greater in diameter than the small diameter portion 34 and the flange portion 47 is greater in diameter than the step portion 33c, the coupling cylindrical member 40 is rotatably engaged with and held by the FC type receptacle housing 30.

The FC type receptacle 20 rotatably engaged and held with the coupling cylindrical member 40 in this manner, as shown in FIG. 2, becomes an adapter 1A for FC-FC coupling of FIG. 1 by being coupled and assembled with the FC type receptacle housing 10.

This assembling is made by coupling the male thread portion 44 of the coupling cylindrical member 40 to the female thread portion 14 of the FC type receptacle housing 10 such that the reference concave portion 15 and reference pin 16 of the FC type receptacle housing 10 are respectively engaged with the reference convex portion 35 and reference hole 36 of the FC receptacle housing 30.

Figure 5A:
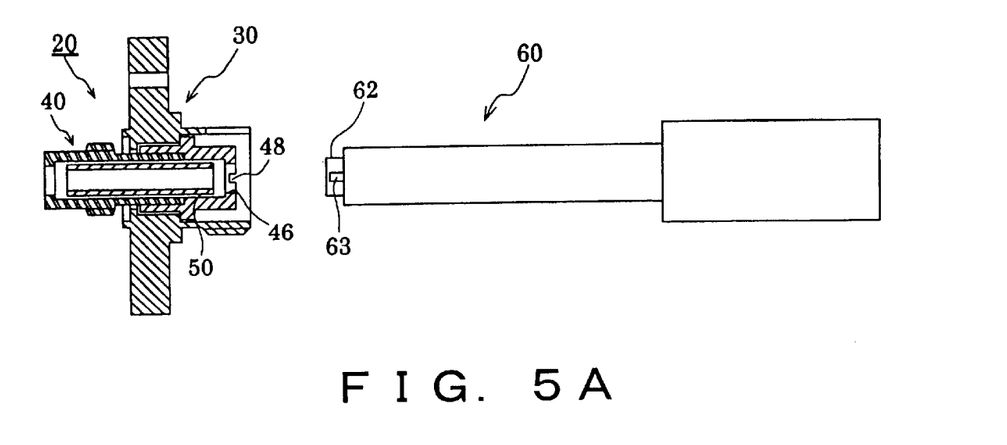
FIGS. 5A and 5B are views showing an operation state of the universal adapter according to the first embodiment of the invention.
Figure 5B:
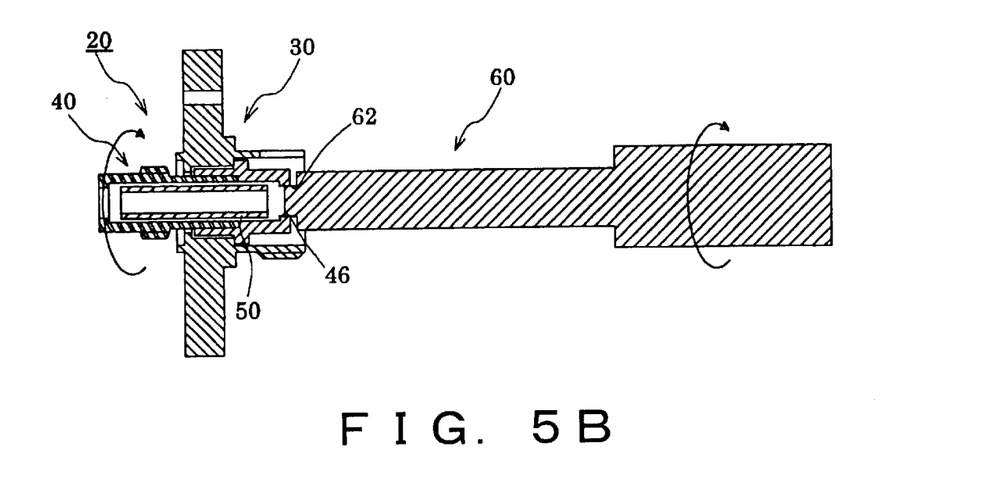

Incidentally, although this coupling can be made by engaging a minus driver with the pair of engaging grooves 48 provided at the end of the second cylindrical member 42, an exclusive jig 60 as shown in FIG. 5 may be used. This jig 60, as shown in FIG. 5A, has at an end a convex portion 62 that can be inserted in the optical coupling opening portion 46, and on an outer peripheral surface of the convex portion 62 engaging protrusions 63 to be engaged with the engaging grooves 48. Accordingly, as shown in FIG. 5B, the convex portion 62 is inserted in the coupling cylindrical member 40 and the engaging grooves 48 engage the engaging protrusions 63 and then the jig 60 is rotated whereby the coupling cylindrical member 40 can be rotated in a state of fixing the FC type receptacle housing 30.

Also, although the FC type receptacle housing 10 is fixable to a member to be fixed through the fixing through-hole 17 (see FIG. 4), the FC type receptacle 20 can be detachably coupled to the FC type receptacle housing 10 fixed in this manner.

Figure 6A:
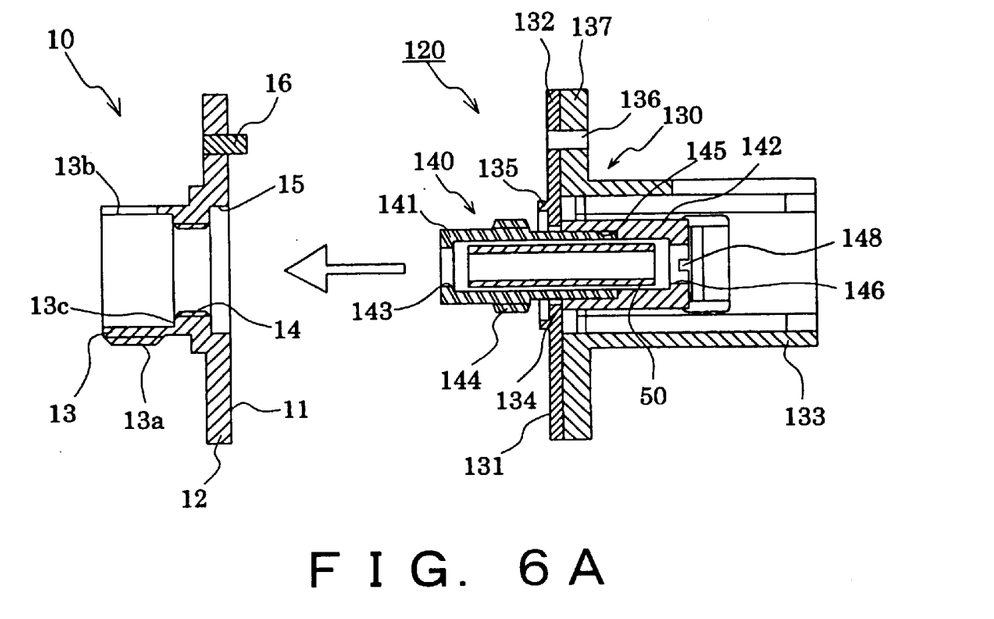
FIGS. 6A and 6B are sectional views of a universal adapter according to a second embodiment of the invention.
Figure 6B:
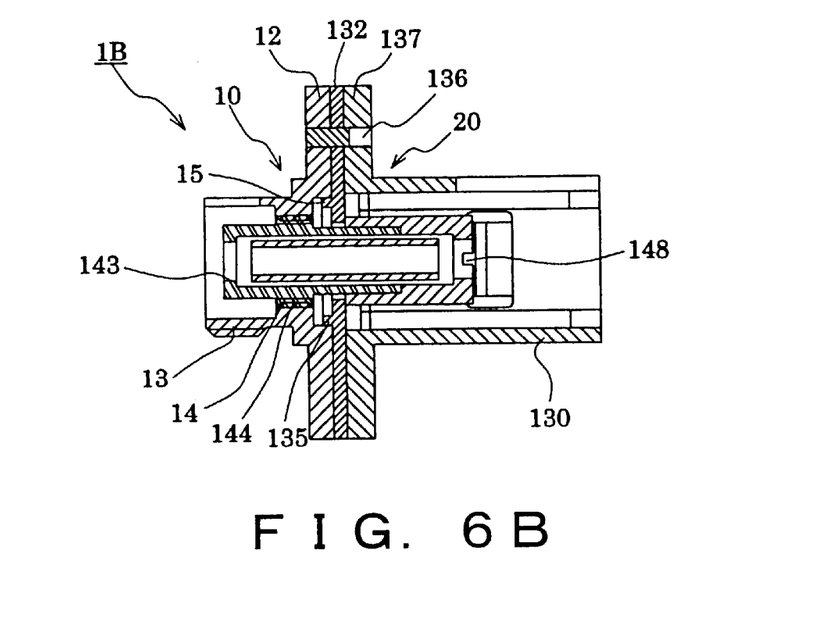

FIGS. 6A and 6B illustrate another embodiment. A universal adapter 1B is assembled as an FC-SC connection adapter, which is assembled with the above-stated FC type receptacle housing 10 and a SC type receptacle 120.

Here, the SC type receptacle 120 is similar in basic structure to the FC type receptacle 20 except for having structure connectable to an SC type optical connector plug, and identical in that it can be detachably coupled to the FC type receptacle housing 10.

Here, the SC type receptacle 120 is formed by an SC type receptacle housing 130 and a coupling cylindrical member 140.

The SC type receptacle housing 130 is identical to the FC type receptacle housing 30 except that it is made in a shape connectable with an SC type optical connector plug. That is, on an opposite side to a reference plane 131 of a base plate 132 having the reference plane 131 on one side, a flange portion 137 of a coupling portion 133 formed by a cylindrical member couplable with an SC type connector plug. The base plate 132 is provided with a through-hole having a smaller diameter portion 134 at its peripheral edge portion. In the reference plane 131 a ring formed reference convex portion 135 is provided that engages a reference convex portion 15 provided in the reference plane 11 of the FC type receptacle housing 10, and a reference bore 136 for insertion of a reference pin 16 is provided in the base plate 132 and the flange portion 137.

Meanwhile, the coupling cylindrical member 140 has a press-fitted pair comprising a first cylindrical member 141 and second cylindrical member 142, and incorporates inside an optical connection sleeve 50, such as a split sleeve. That is, the first cylindrical member 141 has an inner diameter size capable of incorporating the optical connection sleeve 50 in a play fit state. On one side an optical coupling opening 143 is provided having a greater inner diameter size than an inner diameter size of the optical connection sleeve 50 although somewhat smaller in diameter than an outer shape size of the optical connection sleeve 50. Also, in an outer peripheral surface a male thread portion 144 is provided which is to be coupled to the female thread portion 14 of the FC type receptacle housing 10. Meanwhile, the second cylindrical member 142 has a fitting portion 145 having an inner diameter size to allow fitting to the first cylindrical member 141, which also has one end side an optical coupling opening 146 having generally the same size as the optical coupling opening 143. Furthermore, a pair of engagement grooves 148 are provided in diametrically opposite positions at a peripheral edge portion of the optical coupling opening 146. Incidentally, the first cylindrical member 141 and second cylindrical member 142 have end shapes, on the side of the optical coupling openings 143 and 146, respectively couplable to the optical connector plugs.

If the first cylindrical member 141 and second cylindrical member 142 are press-fitted in a state of incorporating the optical connection sleeve 50 and the first cylindrical member 141 is inserted in the smaller diameter portion 134 of the SC type receptacle housing 130, because the male thread portion 144 is greater in diameter than the end-portion smaller diameter portion 134 of the second cylindrical member 142, the coupling cylindrical member 140 is rotatably engaged with and held by the SC type receptacle housing 130.

The SC type receptacle 120 rotatably engaged and held with the coupling cylindrical member 140 in this manner becomes an FC-SC coupling adapter 1B by being coupled and assembled with the FC type receptacle housing 10. Incidentally, this assembling can be performed similarly to the one mentioned above.

Figure 7A:
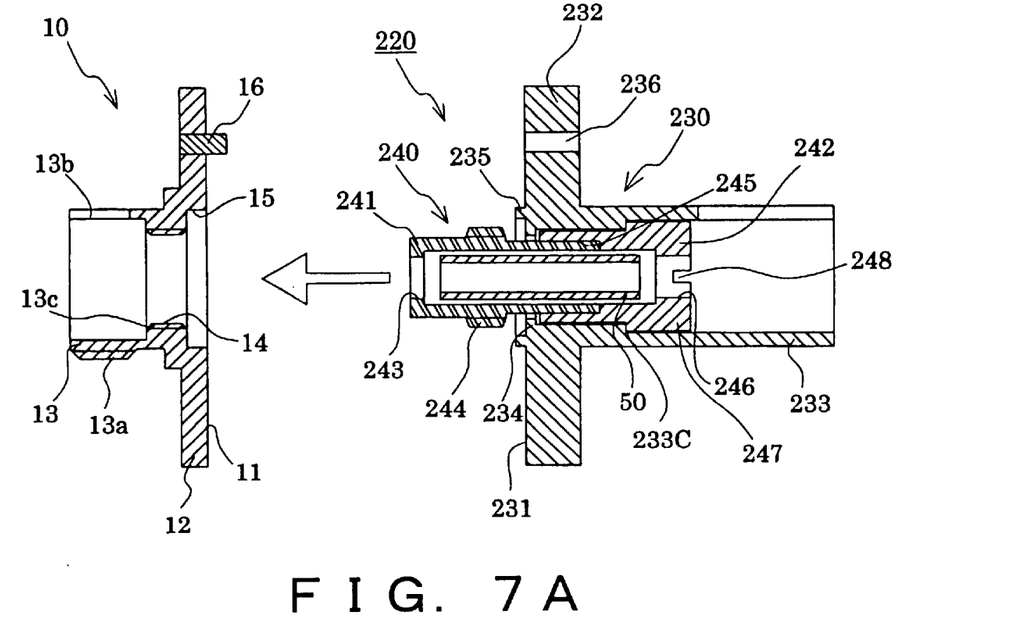
FIGS. 7A and 7B are sectional views of a universal adapter according to a third embodiment of the invention.
Figure 7B:
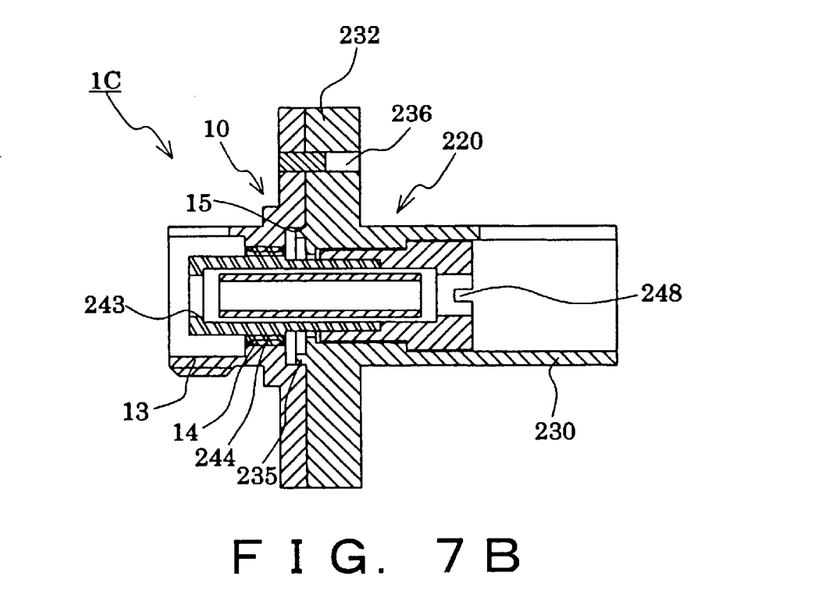

FIGS. 7A and 7B show another embodiment. A universal adapter 1C in this embodiment is assembled as a FC-ST connection adapter, which is assembled with the above-stated FC receptacle housing 10 and the ST type receptacle 220.

Here, the ST type receptacle 220 is similar in basic structure to the FC type receptacle 20 except for having structure connectable with an ST type optical connector plug, and is identical in that it is detachably couplable to the FC type receptacle housing 10.

Here, the ST type receptacle 220 is formed by an ST type receptacle housing 230 and a coupling cylindrical member 240.

The ST receptacle housing 230 has generally the same shape as the FC type receptacle housing 10. That is, on an opposite side to a reference plane 231 of a base plate 232 having the reference plane 231 on one side, a coupling portion 233 is provided that is formed by a cylindrical member having a shape couplable with a ST type optical connector plug wherein a step portion 233c is provided at an inward portion thereof. Meanwhile, on a reference plane 231 side of the coupling portion 233 a smaller diameter portion 234 is provided. On the reference plane 231 a ring formed reference convex portion 235 is provided which is to be coupled to a reference concave portion 15 provided on the reference plane 11 of the FC type receptacle housing 10, and in the base plate 232 a reference hole 236 is provided which is to be fitted with the reference pin 16.

Meanwhile, the coupling cylindrical member 240 has press-fitted first cylindrical member 241 and second cylindrical member 242, and incorporates at the inside thereof an optical connection sleeve 50, such as a split sleeve. That is, the first cylindrical member 241 has an inner diameter capable of incorporating the optical connection sleeve 50 in a play fit state. On one end side, an optical coupling opening portion 243 is provided that has an inner diameter size greater than the inner diameter size of the optical connecting sleeve 50 although somewhat smaller in inner diameter size than the outer diameter size of the sleeve 50. Also, on an outer peripheral surface, a male thread portion 244 is provided to be coupled to the female thread portion 14 of the FC type receptacle housing 10. Also, the second cylindrical member 242 has a fitting portion 245 having an inner diameter size to be fitted with the first cylindrical member 241, and has on one end side an optical coupling opening portion 246 with generally the same size as the optical coupling opening portion 243 and on the outer peripheral surface a step portion 247 having a greater diameter than the inner diameter of the step portion 233c. Furthermore, a pair of engaging grooves 248 are provided in diametrically opposite positions in a peripheral edge portion of the optical coupling opening portion 246. Incidentally, the first cylindrical member 241 and the second cylindrical member 242 have end shapes on sides of the optical coupling opening portions 243 and 246 respective of which can couple with the optical connector plug.

If the first cylindrical member 241 and second cylindrical member 242 thus formed are press-fitted in a state incorporating the optical connecting sleeve 50 and the first cylindrical member 241 is inserted in the small diameter portion 234 of the ST type receptacle housing 230, because the male thread portion 244 is greater in diameter than the small diameter portion 234 and the step portion 247 is greater in diameter than the step portion 233c, the coupling cylindrical member 240 is rotatably engaged with and held by the ST type receptacle housing 230.

The ST type receptacle 220 rotatably engaged and held with the coupling cylindrical member 240 in this manner becomes a FC-ST coupling adapter 1C by being coupled and assembled with the FC type receptacle housing 10. Incidentally, this assembling can be performed similarly to the one stated above.

As explained above, the above-described FC type receptacle housing 10 decouplably is coupled with any of the FC type receptacle 20, the SC type receptacle 120 and the ST type receptacle, thus structuring a universal adapter in variety of types. That is, if a universal adapter as this is used, the FC type optical connector plug can be switch-connected to an optical connector plug in variety of types.

Also, switch-connection having- been conventionally impossible becomes possible because replacement is possible with a receptacle in variety of kinds of a FC type receptacle 20, a SC type receptacle 120 and a ST type receptacle 220 in a state of fixing the FC type receptacle housing 10.

Naturally, the receptacle housing on the fixing side can be modified to a SC type or a ST type. Also, it is needless to say that the above-described various structures can be modified within a range of the rating of the various optical connectors and within a range not departing from the gist of the invention. Furthermore, it is naturally possible to make as an adapter for an optical connector in various kind other than the FC type, SC type and ST type.

As explained above, according to the universal adapter of the present invention, it is possible to easily switch over for various kinds of optical connector plugs. For example, for one kind of optical connector plug, various kinds of optical connector plugs can be switchably connected.

What is claimed is:

1. A universal optical connector adapter for optically detachably connecting optical connector plugs having ferrules fixed at ends of optical fibers, comprising: first and second receptacle housings each having at a first end a coupling portion having a cylindrical receptacle for detachably coupling with an optical connector plug of a given type and at a second end a base plate having a first side facing the cylindrical receptacle and a second side opposite the first side, the second side defining a reference plane; a cylindrical coupling member rotatably engaged to the base plate inward of the coupling portion of the first receptacle housing and incorporating a sleeve for fitting the ferrules of the optical connector plugs to be connected from opposite sides thereof; a male thread portion provided in an outer periphery of the cylindrical coupling member on the reference plane side of the base plate of the first receptacle housing; and a female thread portion provided in the coupling portion of the second receptacle housing on a side opposite that where the cylindrical receptacle for coupling with the optical connector plug is disposed and being removably couplable with the male thread portion; wherein the first and second receptacle housings can be detachably coupled by engaging the male and female thread portions so that the respective reference planes are held in close contact with each other.

2. A universal optical connector adapter according to claim 1; wherein the coupling portion of the first and second receptacle housings are each couplable with a different one of optical connector plugs of an FC type, an SC type and an ST type.

3. A universal optical connector adapter according to either one of claims 1 or 2; wherein a rotation groove engageable with a jig for rotating the cylindrical coupling member is formed in an end face on an opposite side of a coupling portion of the cylindrical coupling member used for coupling with the second receptacle housing, so that the jig may be used to connect or disconnect the first and second receptacle housings.

4. A universal optical connector adapter according to either one of claim 1 or 2; wherein the second receptacle housing is connectable to an optical connector plug while the reference plane thereof is exposed, and the first receptacle housing is connectable to the second receptacle housing the optical connector plug connected to the second receptacle housing.

5. A universal optical connector adapter according to any one of claims 1 to 2; wherein at least one engaging protrusion is provided on one of the reference planes of the first and second receptacle housings and at least one hole for engagement with the at least one engaging protrusion is provided on the reference plane of the other one of the first and second receptacle housings.

6. A universal optical connector adapter according to claim 5; wherein the at least one the engaging protrusion and the at least one hole comprise a pair of engaging protrusions and a pair of holes for engagement with the pair of engaging protrusions so that relative movement of the receptacle housings in a direction along the reference plane and rotation in a plane along the reference plane are restricted.

7. A universal optical connector adapter according to claim 1; wherein the sleeve extends from opposite sides of the reference plane of the first receptacle housing.

8. A universal optical connector adapter according to claim 7; wherein the sleeve extends into the second receptacle housing when the first and second receptacle housings are coupled together.

9. A universal optical connector adapter according to claim 1; wherein the cylindrical receptacles of the first and second receptacle housings are configured to detachably couple with an optical connector plug of one of an FC type, an SC type and an ST type.

10. A universal optical connector adapter according to claim 9; wherein the cylindrical receptacles of the first and second receptacle housings are each configured to detachably couple with a different one of optical connector plugs of the FC type, the SC type and the ST type.

11. A universal optical connector adapter according to claim 1; wherein the cylindrical coupling member comprises a first cylindrical member disposed inward of the cylindrical receptacle of the first receptacle housing, and a second cylindrical member having a portion provided with an outer diameter slightly smaller than an inner diameter of the first cylindrical member so that the first and second cylindrical members may be slidably fixedly engaged.

12. A universal optical connector adapter according to claim 11; wherein the first cylindrical member is disposed on a side of the base plate of the first receptacle housing opposite the reference plane, and the second cylindrical member has a first portion disposed on the reference plane side of the base plate and a second portion extending to the opposite side of the base plate through a hole formed therein, the second portion being slidably fixedly engaged with the first cylindrical member.

13. A universal optical connector adapter according to claim 12; wherein the first portion of the second cylindrical member has a larger outer diameter than the hole, the second portion of the second cylindrical member has a smaller outer diameter than the hole, and the first cylindrical member has a larger outer diameter than the hole, so that the cylindrical coupling member is rotatably engaged by the base plate.

14. A universal optical connector adapter according to claim 13; wherein the male thread portion is formed on the first portion of the second cylindrical member.

15. A universal adapter for optically detachably connecting optical connector plugs of the same or different types, comprising: a first housing having a first support member, a first receptacle extending from the first support member for detachably connecting to an optical connector plug of a given type, and a coupling member rotatably engaged to the support member inward of the first receptacle and containing a sleeve for fitting ferrules from optical connector plugs into opposite sides thereof, the coupling member comprising a first cylindrical member disposed inward of the first receptacle of the first housing, and a second cylindrical member having a portion provided with an outer diameter slightly smaller than an inner diameter of the first cylindrical member so that the first and second cylindrical members may be slidably fixedly engaged; and a second housing comprising a second support member and a second receptacle extending from the second support member for detachably connecting to another optical connector plug of a given type; the first and second housings being detachably connectable so that optical connector plugs of the same or different types coupled to the first and second receptacles of the first and second housings may be coupled.

16. A universal adapter according to claim 15; wherein the receptacles of the first and second housings are each detachably connectable with optical connector plugs of a different one of an FC type, an SC type and an ST type.

17. A universal adapter according to claim 15; wherein the coupling member has a rotation groove for,med in an end face thereof for engaging with a jig used for rotating the coupling member to connect and disconnect the first and second housings.

18. A universal adapter according to claim 15; wherein at least one engaging protrusion is provided on the support member of one of the first and second housings, and at least one hole for engagement with the at least one engaging protrusion is provided on the support member of the other one of the first and second housings.

19. A universal adapter according to claim 15; wherein a male thread is provided on the coupling member and a female thread is provided on the second housing for engaging with the male thread.

20. A universal adapter according to claim 15; wherein the first receptacle of the first housing is configured to detachably couple with an optical connector plug of one of an FC type, an SC type and an ST type, and the second receptacle of the second housing is configured to detachably couple with an optical connector plug of a different one of the FC type, the SC type and the ST type.

21. A universal adapter according to claim 15; wherein the sleeve extends from opposite sides of the support member of the first housing.

22. A universal adapter according to claim 21; wherein the sleeve extends into the second housing when the first and second housings are coupled together.

23. A universal adapter according to claim 15; wherein the first cylindrical member is disposed on a first side of the first support member of the first housing and the second cylindrical member has a first portion disposed on a second side of the first support member opposite the first side and a second portion extending through a hole formed in the first support member, the second portion being slidably fixedly engaged with the first cylindrical member.

24. A universal adapter according to claim 23; wherein the first portion of the second cylindrical member has a larger outer diameter than the hole, the second portion of the second cylindrical member has a smaller outer diameter than the hole, and the first cylindrical member has a larger outer diameter than the hole, so that the coupling member is rotatably engaged by the first support member.

25. A universal adapter according to claim 24; wherein a male thread is provided on the first portion of the second cylindrical member, and a female thread is provided on the second housing for engaging with the male thread.

* * * * *